Dec. 31, 1957   H. VERSE   2,818,510
DIAGNOSTIC X-RAY DEVICE
Filed July 22, 1954   5 Sheets-Sheet 1

INVENTOR
HANSHEINRICH VERSE
BY
AGENT

Dec. 31, 1957     H. VERSE     2,818,510
DIAGNOSTIC X-RAY DEVICE

Filed July 22, 1954     5 Sheets-Sheet 3

INVENTOR
HANSHEINRICH VERSE
AGENT

Dec. 31, 1957 H. VERSE 2,818,510
DIAGNOSTIC X-RAY DEVICE
Filed July 22, 1954 5 Sheets-Sheet 4
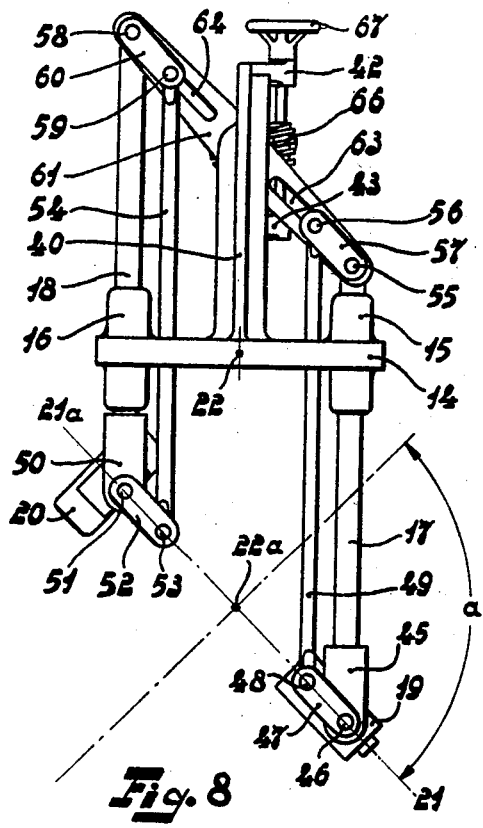
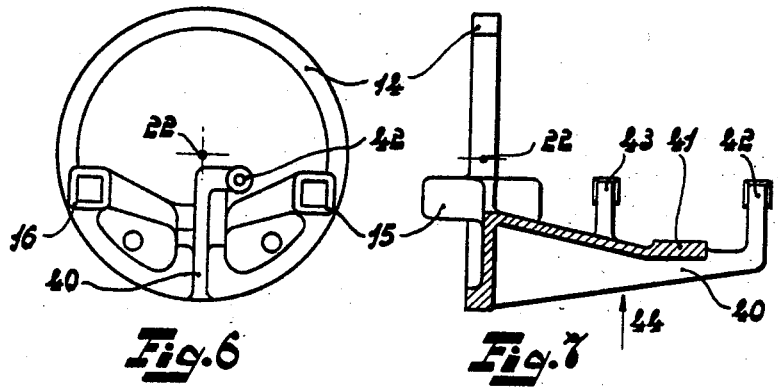
INVENTOR
HANSHEINRICH VERSE
BY
AGENT Dec. 31, 1957 H. VERSE 2,818,510
DIAGNOSTIC X-RAY DEVICE
Filed July 22, 1954 5 Sheets-Sheet 5

INVENTOR
HANSHEINRICH VERSE
AGENT

United States Patent Office 2,818,510
Patented Dec. 31, 1957

2,818,510
DIAGNOSTIC X-RAY DEVICE

Hansheinrich Verse, Hamburg-Fuhlsbuttel, Germany, assignor, by mesne assignments, to North American Philips Company, Inc., New York, N. Y., a corporation of Delaware Application July 22, 1954, Serial No. 445,064
Claims priority, application Germany July 23, 1953
4 Claims. (Cl. 250—91)

In order to control the process of operations by means of X-rays, one usually manages to get on with the ordinary X-ray screen. However, observations with such a screen can be made only if the conditions are favourable. In certain cases an X-ray photograph is taken for control purposes, which photograph after rapid development of the film is inspected by the physician before he proceeds with the operation. At this time there is no X-ray device in existence which is suitable more particularly for use with operations.

It is to be expected that X-ray image amplifiers will be used for observations during operations on an ever-growing scale and hence there is a need of an X-ray device suitable for this purpose. This need is fulfilled by the present invention.

It is not yet certain in what operations X-ray diagnosis may be used successfully. It will be only after extensive experiments that this question can be answered. The device according to the invention is adapted to perform observations under all kinds of conditions. It is of such design that the X-rays may be given a quite arbitrary course according to the location of the part of the patients' body which is to be screened. The carrying members for the X-ray tube and the luminoscope are nevertheless so far remote from the operation table that the operator is not hindered in his movements. The device is adapted to be moved into any position with respect to the operation table. In its design allowance has also been made for requirements of sterilisation and for the necessity that an assistant must be able to move the device into the position required to direct the rays as favourably as possible without troubling the staff directly engaged in the operative treatment.

The device for X-ray investigation with image amplification according to the invention, which is particularly suited for use with operations, comprises a supporting column arranged on an underframe on wheels and carrying a vertically movable carriage with counterweight. The carriage has secured to it a supporting ring which can rotate about its horizontal centre line and which can also turn about a vertical axis. The supporting ring concentrically surrounds an inner ring which can rotate about its axis and which comprises two sliding sleeves in which supporting arms for the X-ray tube and the luminoscope can move at right angles to the plane of the ring. The supporting arms are coupled together in such manner that the mutual centering of the X-ray tube and the image amplifier is maintained when one arm is displaced with respect to the other.

In order that the invention may be readily carried into effect, it will now be described with reference to the accompanying drawing showing, by way of example, a structural embodiment of the device according thereto.

Figs. 2 to 12 show several parts of the device individually, so that the shape and the function thereof may be seen more clearly. Identical parts are indicated in all figures by the same reference numerals.

Figure 1:
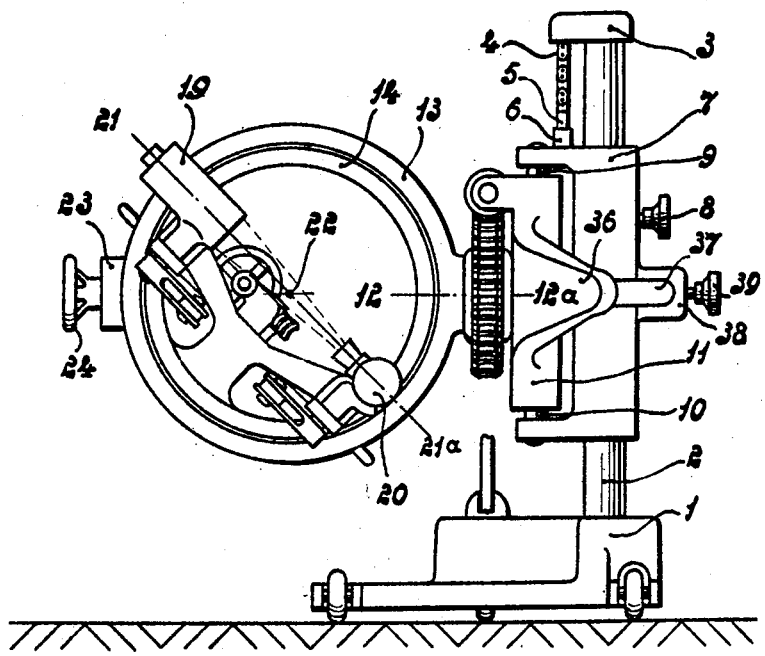
Fig. 1 is a side view of the device.

Fig. 1 shows that side of the device which is adjacent the operation table during operation. An underframe 1 on wheels carries a hollow supporting column 2, from which a carriage 7 is suspended, which is connected to a counterweight through a chain 4, to which the carriage 7 is secured by means of a key 5, 6. The chain 4 extends over a wheel provided in the head 3 of the column. The counterweight is located inside the column. The carriage 7 is adapted to be moved up and down along the column, a brake 8 serving to lock the carriage in position.

A carrying block 11 is secured to the carriage 7 with the use of journals 9 and 10. A supporting ring 13 is secured to the carrying block 11 to be rotatable about its horizontal centre line (the axis 12—12a) and can turn about the vertical axis of the journals 9 and 10.

An inner ring 14 is concentrically arranged inside the supporting ring 13, the inner ring 14 being rotatably supported therein by known means, for example, a ball rim or separate ball bearings, and thus being rotatable about its axis. The inner ring 14 comprises two sliding sleeves 15 and 16, in which arms 17 and 18 carrying a luminoscope 19 having an image plane (not shown) at right angles to the direction of X-rays from a source of X-rays 20, respectively, can move at right angles to the plane of the ring. The axis of the cone of X-rays 21—21a intersects the centre line of ring 14, the arms 17 and 18 being coupled together in such manner that such is always the case, irrespective of relative displacement of the said arms.

A device 23, 24 is, in addition, provided on the supporting ring 13. If the assembly following the rotation of the inner ring is in equilibrium with respect to the axis 22, the device 23, 24 may be an ordinary clamping device. If such is not the case, it must be constituted by a selfbraking torsional device, by means of which the inner ring 14 and the supporting ring 13 may be caused to rotate about the axis 22 by turning the handwheel 24.

Figure 2:
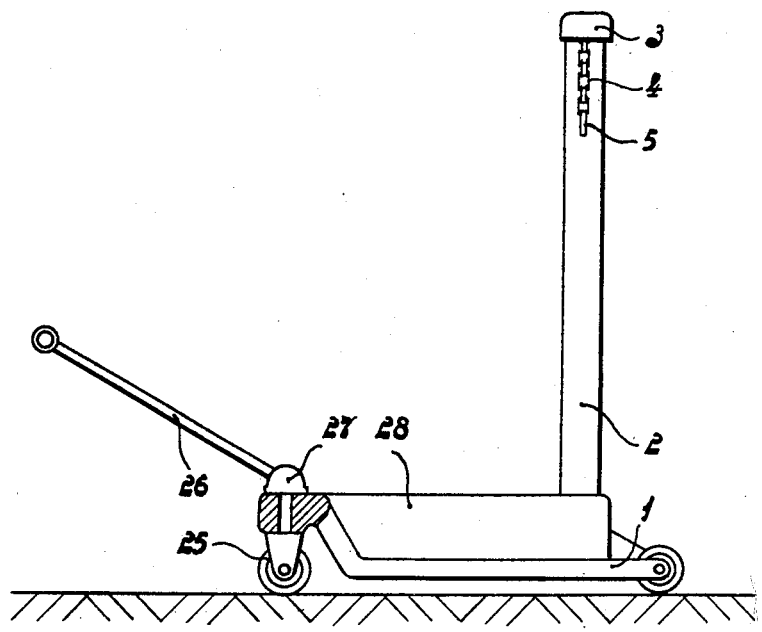
Figure 3:
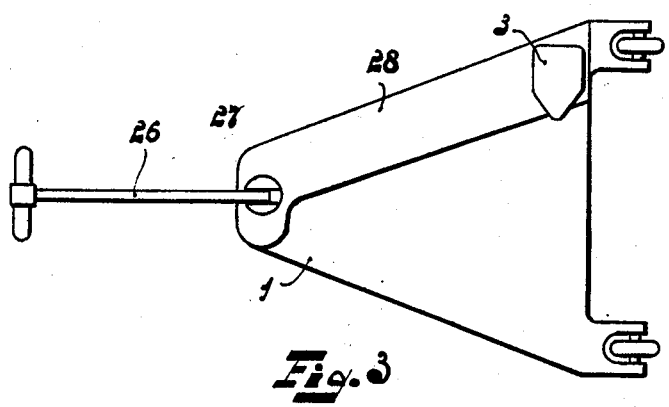

Figs. 2 and 3 are a side view and a plan view respectively of the parts indicated by 1 to 5 in Fig. 1. On the side remote from the operation table, the underframe 1 bears on a swivel 25 which is connected to a pole 26 which can rotate in a ball-head 27. In order to keep the assembly in equilibrium despite the inclined load on the construction, the underframe is made heavier on the side 28 which is most remote from the supporting ring 13.

Figure 4:
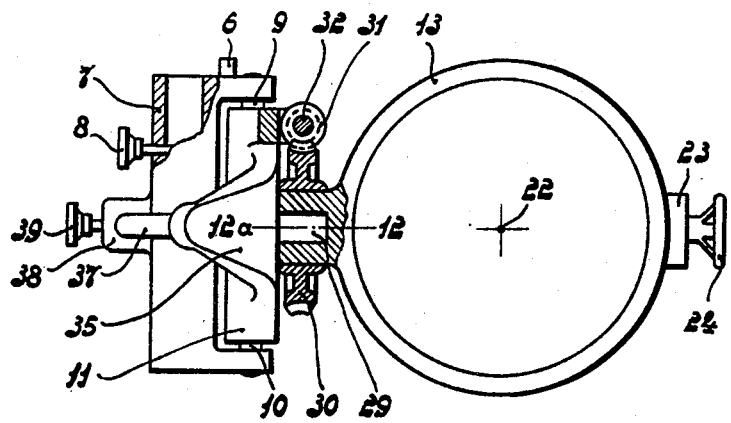
Figure 5:
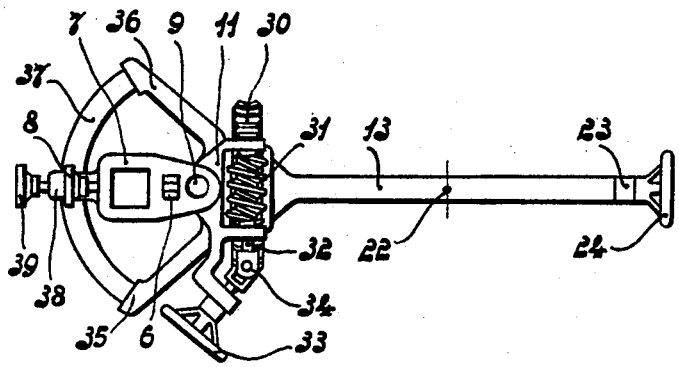

Figs. 4 and 5 serve to show the parts 11, 13, 23, 24 more clearly. Provided on the carrying block 11 is a butt of a shaft 29 surrounded by a sleeve provided on supporting ring 13, so that this ring can rotate about the axis 12—12a. A wormwheel 30, which can co-operate with a worm 31, is arranged on the said sleeve. The worm 31 is journalled with its shaft 32 in a gaff provided on the carrying block 11 and may be rotated by means of a handwheel 33. The latter may be in rectilinear connection with the shaft 32, but alternatively through an angle by means of a Cardan joint 34 (see Fig. 5), if this is preferable from a structural viewpoint. As an alternative, use may be made of a set of conical wheels instead of the said Cardan joint.

The carrying block 11 exhibits two rings 35 and 36 interconnected by means of a clasp 37. The assembly serves to limit the deviation of the carrying block and to lock it in position. The clasp extends through a head 38 of the carriage 7 and may be clamped in position by means of a handle 39.

The shape of the inner ring 14, the manner in which the luminoscope 19 and the source of rays 20 are arranged and the operation of the centring mechanism will now be described with reference to Figs. 6 to 12 inclusive.

Fig. 6 shows the inner ring 14 as viewed in the direction opposite to that in which it is shown in Fig. 1. On the side remote from the operation table, it carries an outholder 40, on which a turn-table 41 and two brackets 42 and 43 may be seen in Fig. 7.

Fig. 8 shows the inner ring from below (in the direction of arrow 44 in Fig. 7), complete with the supporting arms 17, 18 and the rod system which ensures that the axis of the cone of X-rays 21—21a invariably passes through the point 22a when the supporting arms are displaced. The angle of deviation of the axis of the cone 21—21a is indicated by α in Fig. 8.

Figure 10:
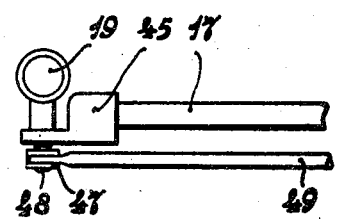

The supporting arm 17 carries, at the extremity adjacent the operation table, a head 45 in which a shaft 46 can rotate. The luminoscope 19 is secured to the upper extremity of shaft 46 and a link 47 is secured to the lower extremity thereof. A coupling rod 49 can rotate about a pin 48 of link 47 and extends through the inner ring 11 to the side of the device remote from the operation table (Fig. 10).

A similar coupling rod 54 is also connected to the supporting arm 18 which carries the source of X-rays. This arrangement is indicated by the numerals 50 to 53. At the other extremity, the supporting arm 17 and the coupling rod 49 turn about pins 55 and 56 of a link 57. A similar arrangement comprising a link 60 and pins 58 and 59 is provided at the other extremity of supporting arm 18 and coupling rod 54.

Figures 9, 11:
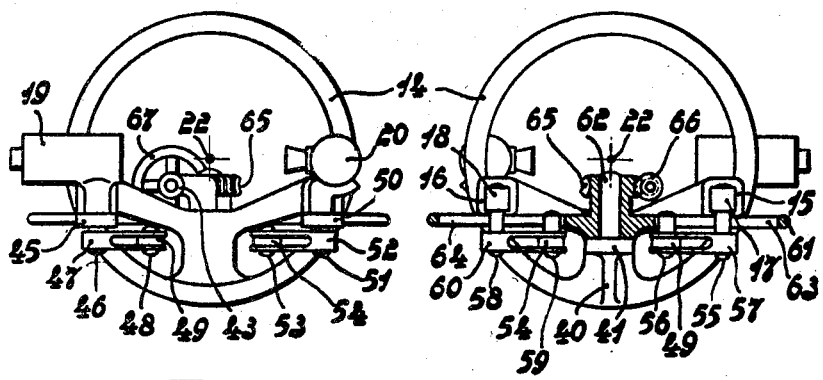

Fig. 9 shows the construction of Fig. 8, as viewed from the operation table, and Fig. 11 shows the opposite side.

In order to move the supporting arms 17 and 18 and at the same time to ensure that the axis of the cone of rays invariably passes through point 22a, the arms 17 and 18 and the coupling rods 49 and 54 are interconnected by means of a yoke 61. The latter turns on the table 41 of inner ring 14 about a journal 62 and it comprises two slots 63 and 64 in which link pins 55, 56 and 58, 59 are guided. When the yoke is rotated about the journal 62 by means of a worm and wormwheel 65, 66 by turning a handwheel 67, the desired control is obtained.

Figure 12:
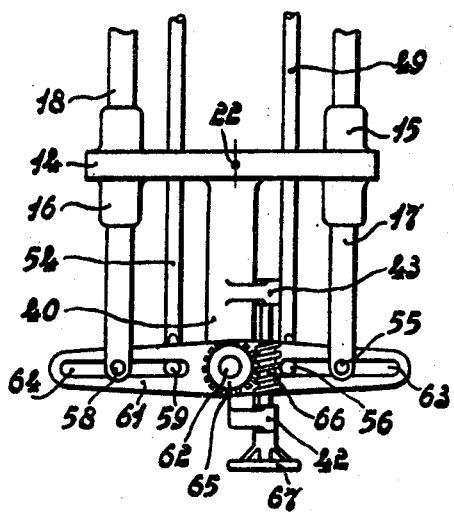

Fig. 12 shows the last-described portion of the rod system, as viewed from above.

The above-described manner of controlling the cone of rays is only an example of how this problem may be mechanically solved. It will be evident that, instead of utilizing a parallelogram of rods, use may alternatively be made of suitable control devices with chain drive. As a further alternative, screw spindles may be used for displacing the luminoscope and the source of rays and the cone of rays may be controlled and the luminoscope may be turned with the use of auxiliary spindles having a different rotational speed or a different pitch.

In order to take full profit of all possibilities of adjustment afforded by the device according to the invention in X-ray investigation, the image amplifier may be provided with a particular viewing system. Suitable optical devices have previously been suggested for this purpose. They comprise two optical joints which are interconnected by a viewing tube and connected to an eye piece. One joint is located in a ball-head provided on the envelope of the image amplifier and the other is located at the area, at which the two viewing tubes, which are relatively movable in one plane, adjoin. Deflection prisms according to König may serve as optical joints, if care is taken to ensure that the rays of the light beams are directed in parallel by lens systems. As an alternative, semi-cubic prisms may be used as optical joints.

What is claimed is:

1. An X-ray device comprising a frame, a vertical column mounted on said frame, a carriage for an X-ray source and a luminoscope mounted for sliding movement on said column, said carriage including a first ring and a second ring concentrically spaced from one another, means for rotating said first ring about the horizontal axis in the plane of said first ring and through its center, means for rotating said first ring about a given vertical axis, means for rotating said second ring about its axis, a pair of spaced parallel supporting arms journalled through said second ring substantially transverse to the plane of said second ring, and control means for centering and adjusting said X-ray source and said luminoscope so that each remain spaced a predetermined fixed distance from a point therebetween when said supporting arms are displaced, said control means being operatively connected to said supporting arms.

2. An X-ray device comprising a frame, a vertical column mounted on said frame, a carriage for an X-ray source and a luminoscope mounted for sliding movement on said column, said carriage including concentrically spaced rings, means for rotating said outer ring about the horizontal axis in the plane of the outer ring and through its center and means for rotation thereof about a given vertical axis, means for rotating said inner ring about its axis and within the inner circumference of said outer ring, a pair of spaced, parallel supporting arms journalled through said inner ring substantially transverse to the plane of said ring, and control means for centering and adjusting said X-ray source and said luminoscope so that each remain a predetermined fixed distance from a predetermined point therebetween when said supporting arms are displaced, said control means being operatively connected to said supporting arms.

3. An X-ray device comprising a frame, a vertical column mounted on said frame, a carriage for an X-ray source and a luminoscope having an image plane therein mounted for sliding movement on said column, said carriage including concentrically spaced rings, means for rotating said outer ring about the horizontal axis in the plane of the outer ring and through its center and means for rotation thereof about a given vertical axis, means for rotating said inner ring within the inner circumference of the outer ring, a pair of spaced parallel supporting arms journalled through said inner ring substantially transverse to the plane of said ring, a yoke pivotally connected to one end of each of said arms on one side of said inner ring, and means mounting said X-ray source and said luminoscope on the other end of said arms, said means including links being pivotally interconnected with said yoke to form a parallelogram, whereby the X-ray source and the luminoscope remain a predetermined fixed distance from a predetermined point during the displacement of the supporting arms to maintain the adjustment of the image plane at right angles to the direction of the X-rays.

4. An X-ray device comprising a counterbalanced frame, a vertical column mounted on said frame, a carriage for an X-ray source and a luminoscope mounted for sliding movement on said column, a carrying block rotatably secured to said carriage, a pair of wings connected to said block and extending rearwardly to surround said carriage, means for adjustably securing said block in selected positions, an outer ring rotatably secured to said block for rotation about the horizontal axis of said ring in the plane of said outer ring and through its center, means for rotating said inner ring within the inner circumference of the outer ring, a pair of spaced parallel supporting arms journalled through said inner ring transverse to the plane of said ring, a yoke pivotally connected to the one end of each of said arms on one side of said inner ring, and means mounting said X-ray source and said luminoscope on the other ends of said arms, said means including links being pivotally interconnected with said yoke to form a parallelogram, whereby the X-ray source and the luminoscope remain centered during the displacement of the supporting arms.

References Cited in the file of this patent

UNITED STATES PATENTS

| Number | Name | Date |
| --- | --- | --- |
| 1,599,696 | Wantz | Sept. 14, 1926 |
| 2,000,497 | Pohl | May 7, 1935 |
| 2,177,808 | Pohl | Oct. 31, 1939 |
| 2,319,712 | Williams | May 18, 1943 |
| 2,441,538 | Steinhaus | May 11, 1948 |
| 2,595,260 | Hollstein | May 6, 1952 |